US00RE35584E

United States Patent [19]

Sonoda et al.

[11] E Patent Number: Re. 35,584

[45] Reissued Date of Patent: Aug. 12, 1997

[54] INDUSTRIAL ROBOT

[75] Inventors: Akikazu Sonoda, Akashi; Shinji Fujita, Kobe; Masahiro Takigawa, Akashi; Katsunori Fukuda, Nagasaki; Hisanori Nakamura, Toyota, all of Japan

[73] Assignees: Kawasaki Jukogyo Kabushiki Kaisha, Hyogo-ken; Toyota Jidosha Kabushiki Kaisha, Aichi-ken, both of Japan

[21] Appl. No.: 515,865

[22] Filed: Aug. 16, 1995

Related U.S. Patent Documents

Reissue of:

[64] Patent No.: 5,145,312
Issued: Sep. 8, 1992
Appl. No.: 681,404
Filed: Apr. 4, 1991

U.S. Applications:

[63] Continuation of Ser. No. 112,470, Aug. 27, 1993, abandoned, which is a continuation of Ser. No. 401,873, Sep. 1, 1989, abandoned.

[30] Foreign Application Priority Data

Sep. 8, 1988 [JP] Japan ..... 63-226157

[51] Int. Cl.[6] ..... B25T 9/10

[52] U.S. Cl. ..... 414/719; 414/744.3; 414/917; 901/28; 901/48; 74/490.03

[58] Field of Search ..... 414/729, 735, 414/744.1, 744.2, 744.3, 719, 917, 219; 901/15, 48, 23, 24, 28; 74/490.03, 490.05

[56] References Cited

U.S. PATENT DOCUMENTS 4,828,451 5/1989 Mikoshi et al. .
4,828,453 5/1989 Martin et al. .
4,921,393 5/1990 Andeen et al. .

FOREIGN PATENT DOCUMENTS 0233712 8/1987 European Pat. Off. .
0269749 6/1988 European Pat. Off. .
57-189781 11/1982 Japan .
58-94980 6/1983 Japan .
60-84280 11/1983 Japan .
63-47078 2/1988 Japan .
1103275 4/1989 Japan .
2113650 8/1983 United Kingdom .

OTHER PUBLICATIONS

Proceedings 1987 IEEE International Conf. on Robotics and Automation, vol. 2, pp. 1186–1191, US; A. H. Soni et al.: "Application of Passive Robot in Spine Surgery", paragraph Instrumentation; Fig. 1.

*Primary Examiner*—Donald W. Underwood
*Attorney, Agent, or Firm*—Oliff & Berridge

[57] ABSTRACT

A spot welding robot including a base and an arm assembly mounted on the base. The arm assembly includes a lower arm mounted at a lower end on the base for a swingable movement about a substantially horizontal first axis, a swingable member mounted on the lower arm at an upper end portion of the lower arm for a swingable movement about a second axis which is parallel with the first axis, and an upper arm mounted at one end portion on the swingable member for a swingable movement about a third axis which is perpendicular to the second axis. The swingable member has a portion extending in a direction opposite to the direction in which the upper arm extends. A driving motor is provided on the swingable member for driving the upper arm to produce the swingable movement of the upper arm about the third axis.

19 Claims, 11 Drawing Sheets

INDUSTRIAL ROBOT

Matter enclosed in heavy brackets [ ] appears in the original patent but forms no part of this reissue specification; matter printed in italics indicates the additions made by reissue.

[This application] *This is a continuation of application Ser. No. 08/112,470 filed Aug. 27, 1993, now abandoned, which in turn is a Reissue of application Ser. No. 07/681,404 filed Apr 4, 1991 (U.S. Pat. No. 5,145,312), which in turn* is a continuation of application Ser. No. 07/401,873, filed Sep. 1, 1989, *now abandoned.*

BACKGROUND OF THE INVENTION

1. Field of the Invention

The present invention relates to an industrial robot and more particularly to an industrial robot having at least three articulated pivotal joints. The present invention can most suitably be applied to a welding robot for carrying out spot welding in a motor vehicle body assembling line but the invention is not limited to such an application.

2. Description of the Prior Art

In the motor vehicle industry, there is an increasing trend of manufacturing the vehicle body by welding thin steel sheets for decreasing the body weight and providing the body with a required rigidity. Spot welding is commonly adopted for the purpose. Recent tendency is that the spot welding is made with finer spacings than used to be so that number of spot welding is substantially increased. As an example, approximately 5000 spot weldings are made in each one of vehicle bodies. It is therefore unavoidably required in a vehicle body assembling line to provide a spot welding line of a substantial distance. From the viewpoint of effective utilization of the factory space, however, it is advisable to make the spot welding line as short as possible.

A typical example of spot welding robots adopted in vehicle body manufacturing lines is shown in FIGS. 10 and 11. As shown, the robot includes a stationary base 1 supporting a swivel body 2 for swivel movements about a vertical axis 3. One the swivel body 2, there is mounted a vertical swing arm 5 for fore-and-aft swinging movements about a horizontal axis 6. On the upper end portion of the arm 5, there is mounted a horizontal swing arm 8 for vertical swing movements about a horizontal axis 7. The horizontal arm 8 carries a hand 9 having welding electrodes at a tip end. A link 11 is provided to extend in parallel with the arm 5 and connected at an upper end with a rearward end portion of the horizontal arm 8. The link 11 has a lower end which is connected with a horizontal link 11a which extends rearwardly from the axis 6 in parallel with the arm 8.

As shown in FIG. 11, the swivel body 2 is provided with a driving motor 4 for driving the arm 5 about the axis 6. The arm 5 is swingable in the fore-and-aft direction through an angular range 82. The swivel body 2 is further provided with a driving motor 10 which is arranged to drive the link 11a so that the link 11 is moved in a vertical direction to thereby make the horizontal arm 8 swing in the vertical direction through an angular range θ3. Appropriate operations of the motors 4 and 10 cause swinging movements of the arms 5 and 8 so that the robot hand 9 can be moved in the region designated by the reference numeral 13.

This type of welding robot is considered as being advantageous in that the robot hand can be moved in a wide range with a relatively small robot body. It should however be noted that the welding robot of this type still has a disadvantage which will be described below. In FIG. 10, the rearward end portion of the arm 8 is shown by the reference numeral 12 when the arm 8 is in the horizontal position and by the reference numeral 14 when the arm 8 is in the fully upwardly swung position. It will therefore be understood that the rearward end portion 14 of the arm 8 projects by a distance R1 from the vertical axis 3 around which the swivel body 2 is rotated.

It will be noted that in this structure the rear end portion 14 of the arm 8 moves along a circular path of a radius R1 with a center at the axis 3 when the robot is rotated about the axis 3. In a typical vehicle body welding line, a plurality of robots 16 are arranged side by side with relatively small spacings between each adjacent two robots as shown in FIG. 12 at each side of a conveyor along which vehicle bodies 15 are moved. The aforementioned movement of the rear end portion 14 of the arm 8 may then cause an interference with the adjacent robot so that a larger spacing between each two adjacent robots must be provided for avoiding such possible interference.

SUMMARY OF THE INVENTION

It is therefore an object of the present invention to provide an industrial robot which requires a smaller space than a conventional robot does.

Another object of the present invention is to provide an industrial robot in which possibility of interference with a robot which is located to the first-mentioned robot can significantly be decreased.

According to the present invention, the above and other objects can be accomplished by an industrial robot including an arm assembly having at least a first arm and a second arm, each having a longitudinal axis, said first arm being mounted at a lower end portion on a base for a swingable movement in a substantially vertical plane about a substantially horizontal first axis, said second arm being provided adjacent to an upper end portion of said first arm to extend in a direction crossing the longitudinal axis of said first arm, pivot means provided between said first and second arms for allowing swingable movements of said second arm with respect to said first arm about a second axis which is perpendicular to the longitudinal axis of said first arm and a third axis which is in a plane containing the longitudinal axis of said first arm, driving means for selectively effecting said swingable movements of said first and second arms.

According to the features of the present invention, the pivot means is provided for allowing a swingable movement about the third axis which is in a plane containing the longitudinal axis of the first arm and the pivot means is located above the first axis which is provided for the swingable movement of the first arm in a substantially vertical plane. It will therefore be understood that the rearward end portion of the second arm will be moved under the swingable movement about the third axis along a circular path of a radius corresponding to a horizontal distance between the pivot means and the rear end of the second arm and this radius does not increase even when the first arm is fully inclined rearward. Thus, the possibility of interference between the rear end of the second arm and an adjacent robot will significantly be decreased.

According to one aspect of the present invention, the second axis is located below the third axis. For the purpose, a swingable member may be connected to the upper end portion of the first arm for the swingable movement about the second axis. The second arm is connected to the swingable member for the swingable movement about the third axis. In this arrangement, the swingable member is swingable in a substantially vertical plane and the third axis lies in this plane. In another aspect of the present invention, the third axis is located below the second axis. In this arrangement, a rotatable member may be provided in axial alignment with the longitudinal axis of the first arm for a rotational movement about the third axis which is in an axial alignment with the longitudinal axis of the first arm. The second arm may then be connected with the rotatable member for the swingable movement about the second axis in a sideward direction.

The above and other objects and features of the present invention will become apparent from the following description of preferred embodiments taking reference to the accompanying drawings.

DESCRIPTION OF THE PREFERRED EMBODIMENT

Figure 1:
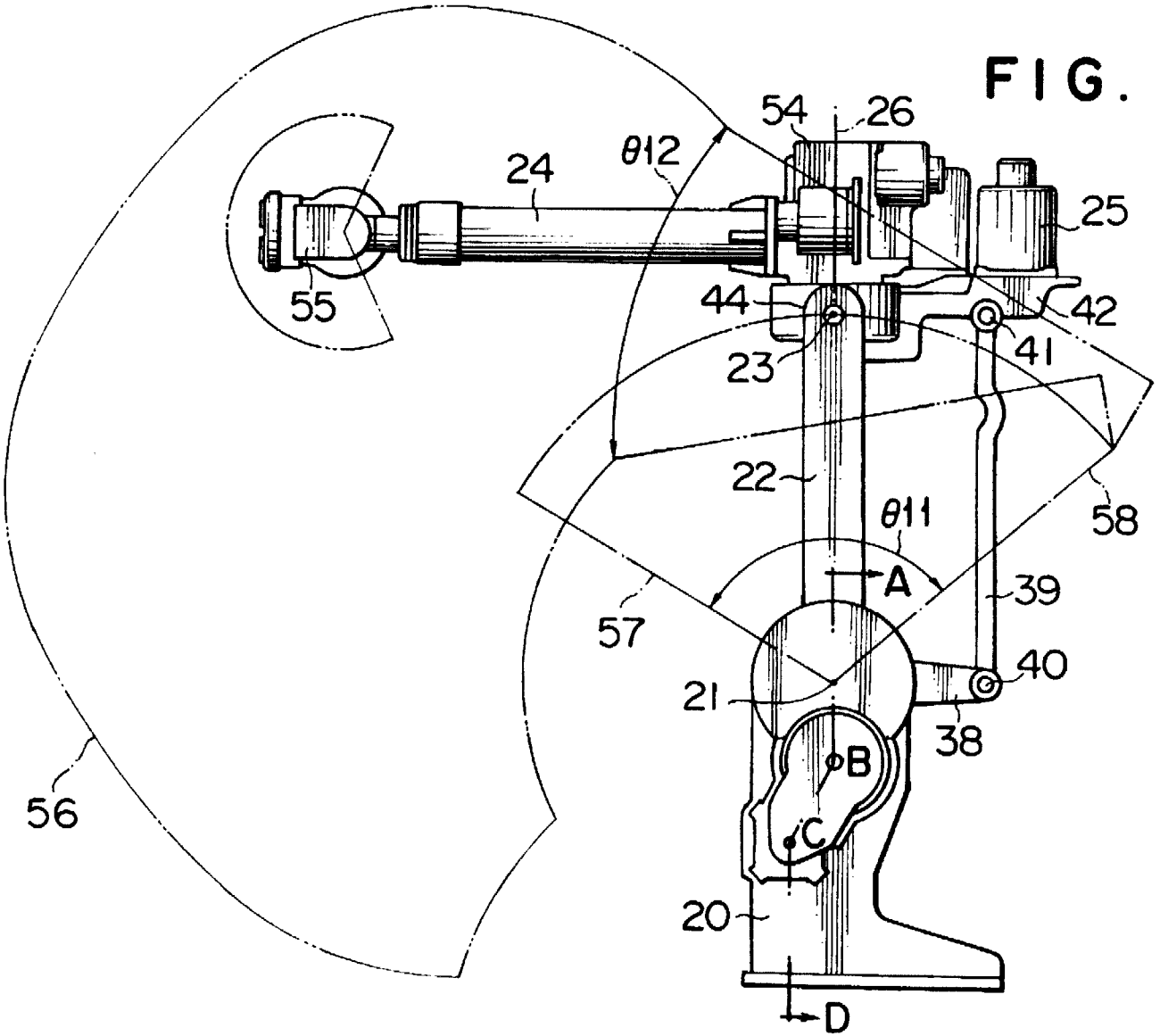
FIG. 1 is a side view of a spot welding robot in accordance with one embodiment of the present invention.
Figure 2:
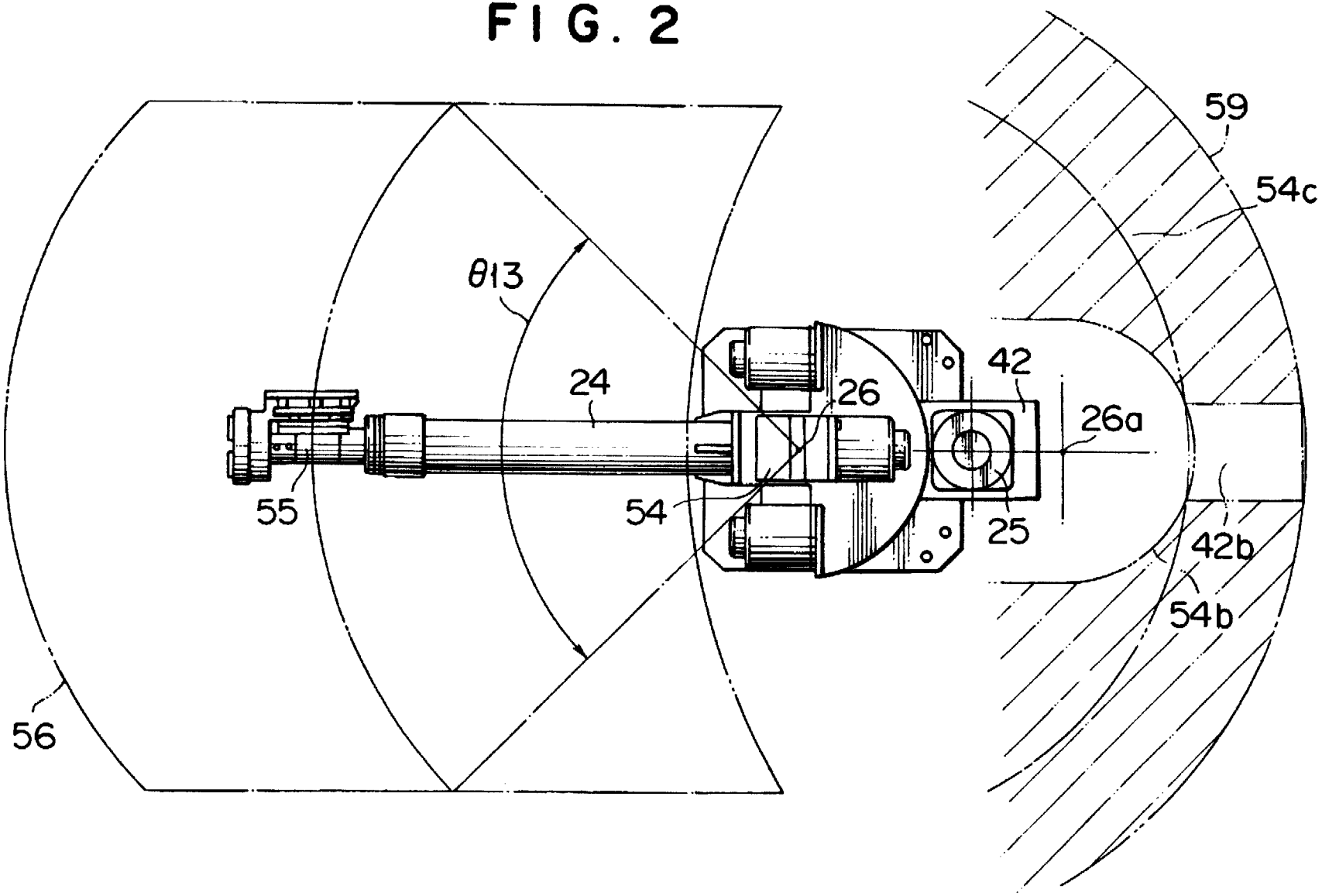
FIG. 2 is a plan view of the robot shown in FIG. 1.
Figure 6:
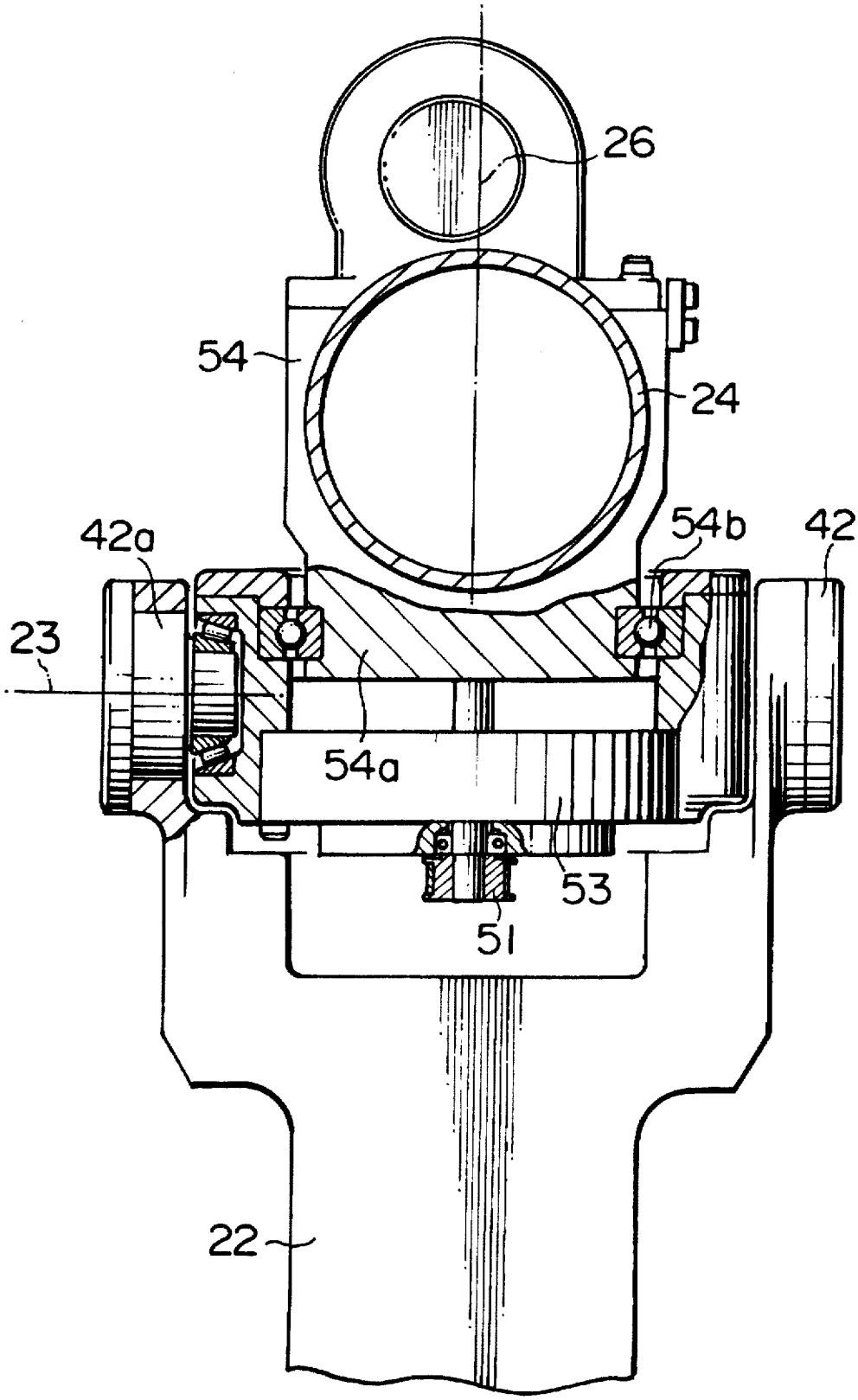
FIG. 6 is a partially cut-away front view of the upper portion of the robot.

Referring to the drawings, particularly to FIGS. 1 and 2, there is shown a spot welding robot including a stationary base 20 supporting a lower arm 22 for a swingable movement about a horizontal axis 21. The lower arm 22 extends upwards from the base 20 and has an upper end on which an upper arm 24 is mounted. For mounting the upper arm 24 on the lower arm 22, there in provided a swingable member or a mounting bracket 42. Referring to FIG. 6, it will be noted that the swingable member 42 has a pair of stub shafts 42a provided at diametrically opposite positions and is mounted at the stub shafts 42a on the upper end portion of the lower arm 22 for swingable movement about a horizontal axis 23.

Figure 4:
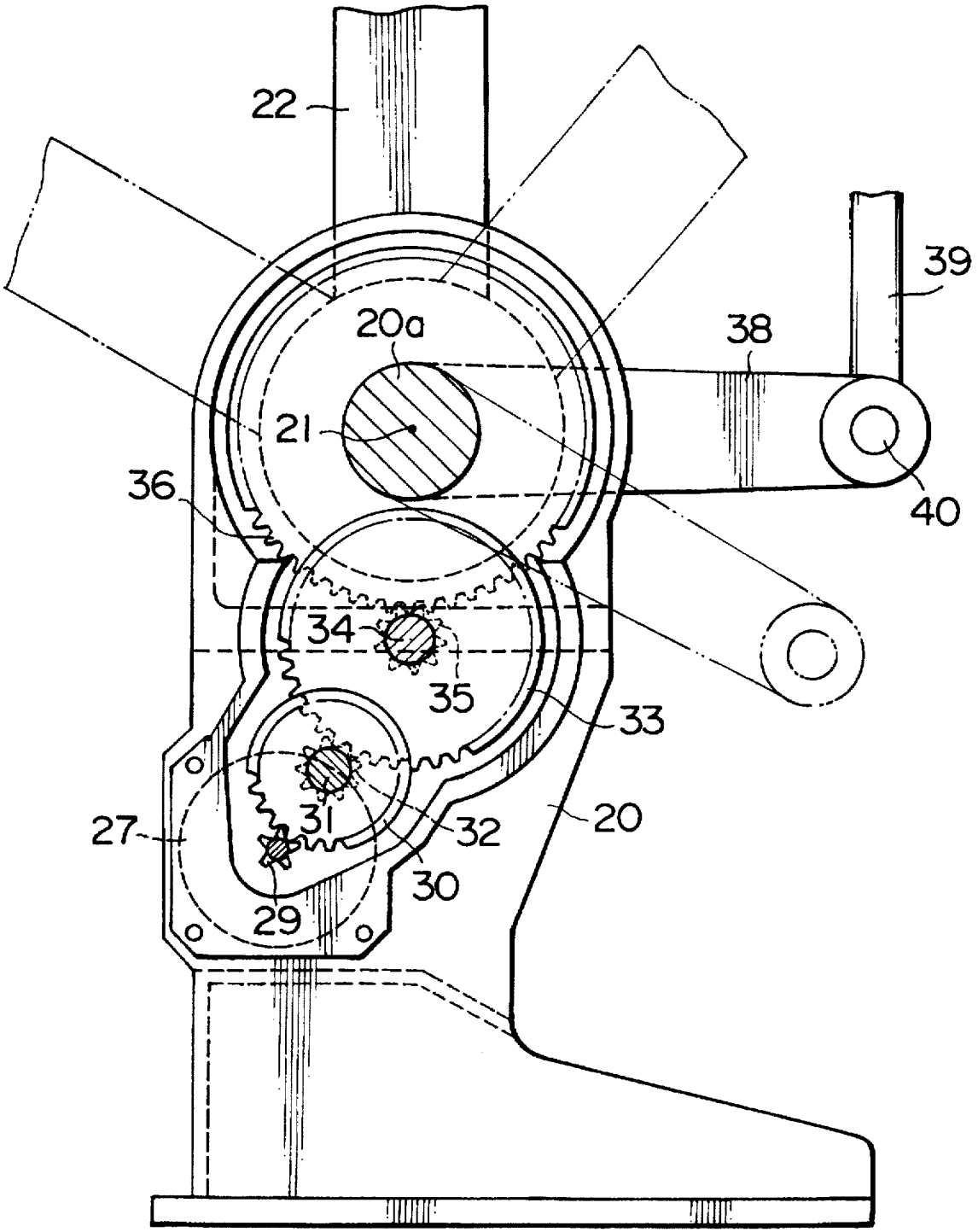
FIG. 4 is a partially cut-away front view of a lower portion of the robot.

As shown in FIG. 1, a link 39 is provided in parallel with the lower arm 22. Referring to FIG. 4, it will be noted that the lower end of the lower arm 22 is mounted on the base 20 through a horizontal shaft 20a which has an axis coaxial with the aforementioned axis 21. A horizontal link 38 is integrally connected at one end with the horizontal shaft 20a. The other end of the horizontal link 38 is pivotally connected through a pin 40 with the lower end of the link 39. The upper end of the link 39 is pivotally connected through a pin 41 with the swingable member 42 as shown in FIG. 1.

Figure 5:
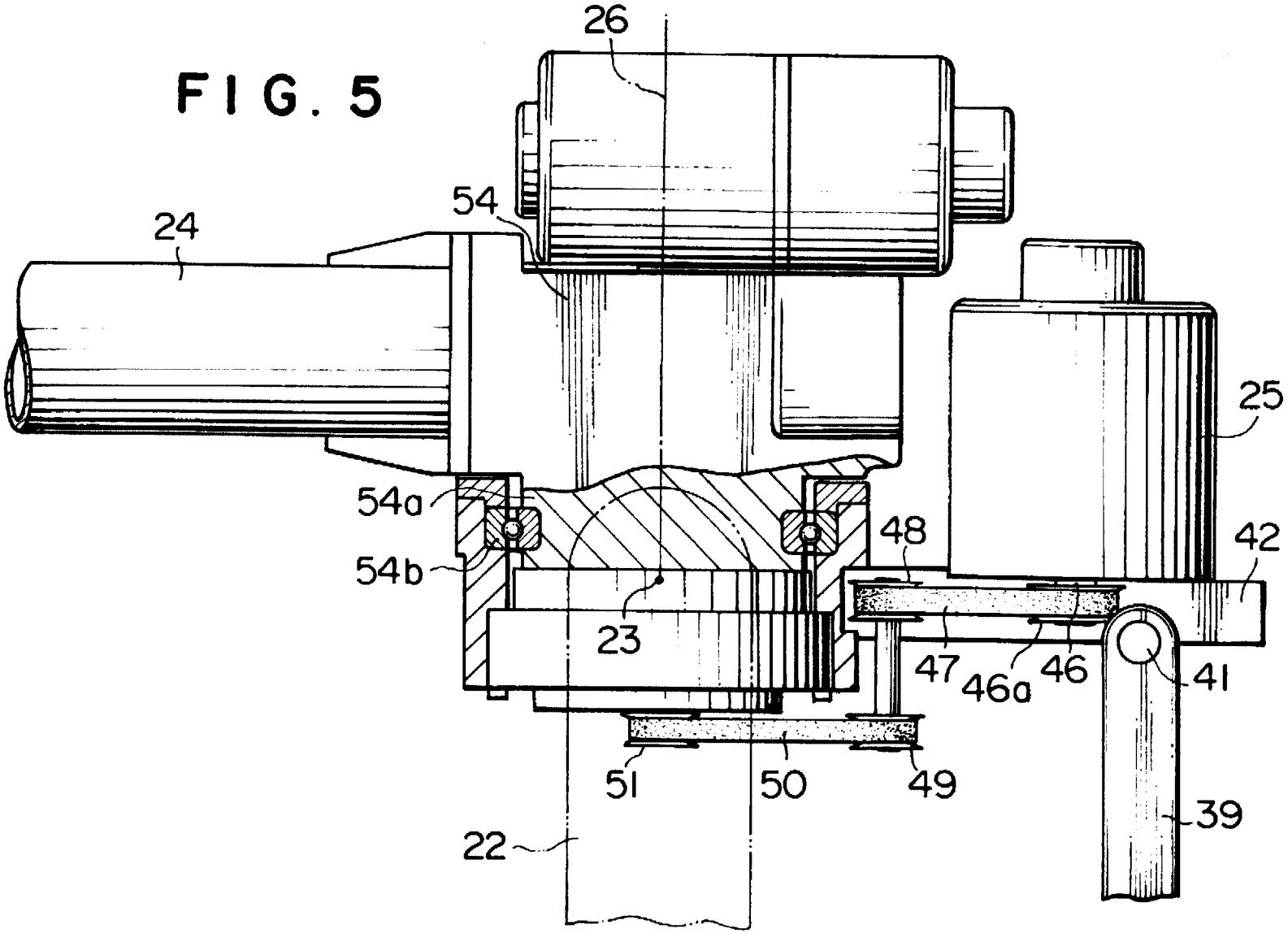
FIG. 5 is a partially cut-away side view of an upper portion of the robot.

Referring to FIGS. 5 and 6, it will be noted that the upper arm 24 is formed at a rear end portion 54 with a stub shaft 54a which is extending vertically downward and mounted through a bearing 54b on the upper end of the lower arm 22 for swingable movement about an axis 26 which is perpendicular to the axis 23. As shown in FIG. 1, the upper arm 24 is provided at a front or tip end with a hand 55 which has welding electrodes.

Figure 3:
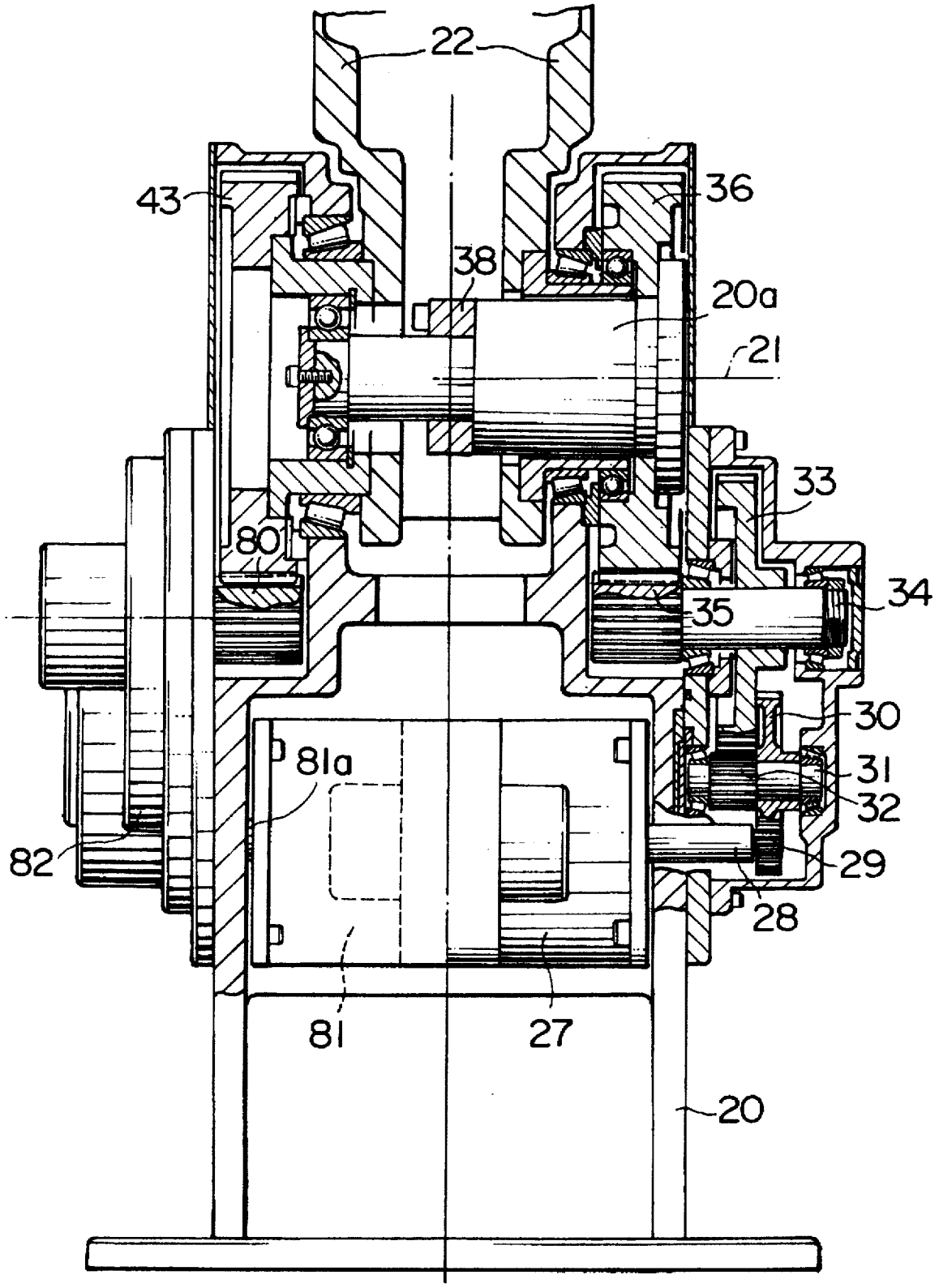
FIG. 3 is a sectional view taken substantially along the line A-B-C-D in FIG. 1.

In order to drive the lower arm 22 for effecting the swingable movement, the arm is provided at the lower end portion with a gear 43 as shown in FIG. 3. The gear 43 is in meshing engagement with a gear 80. A driving motor 81 is provided and has an output shaft 81a which is drivingly connected through a gear mechanism 82 with the gear 80. A selective operation of the driving motor 81 will therefore produce a swingable movement of the lower arm 22 throughout an angular range θ11 shown in FIG. 1.

Referring to FIGS. 3 and 4, it will be noted that the shaft 20a is provided with a gear 36 which is rigidly secured to the shaft 20a. A motor 27 is provided and has an output shaft 28 to which a driving gear 29 is secured. An intermediate gear is provided on an intermediate shaft 31 and is in meshing engagement with the driving gear 29. The intermediate shaft 31 further has a gear 32 secured thereto. The gear 32 on the intermediate shaft 31 is in meshing engagement with a gear 33 provided on a second intermediate shaft 34. The second intermediate shaft 34 has a gear 35 which is in meshing engagement with the driving gear 36 on the shaft 20a. It will be understood that the lower arm 22, the links 38 and 39 and the swingable member 42 provide a parallelogram so that a selective operation of the driving motor 27 causes a swinging movement of the link 38 and a swinging movement of the member 42. Thus, the upper arm 24 is swingably moved through an angular range θ12 as shown in FIG. 1.

Figure 7:
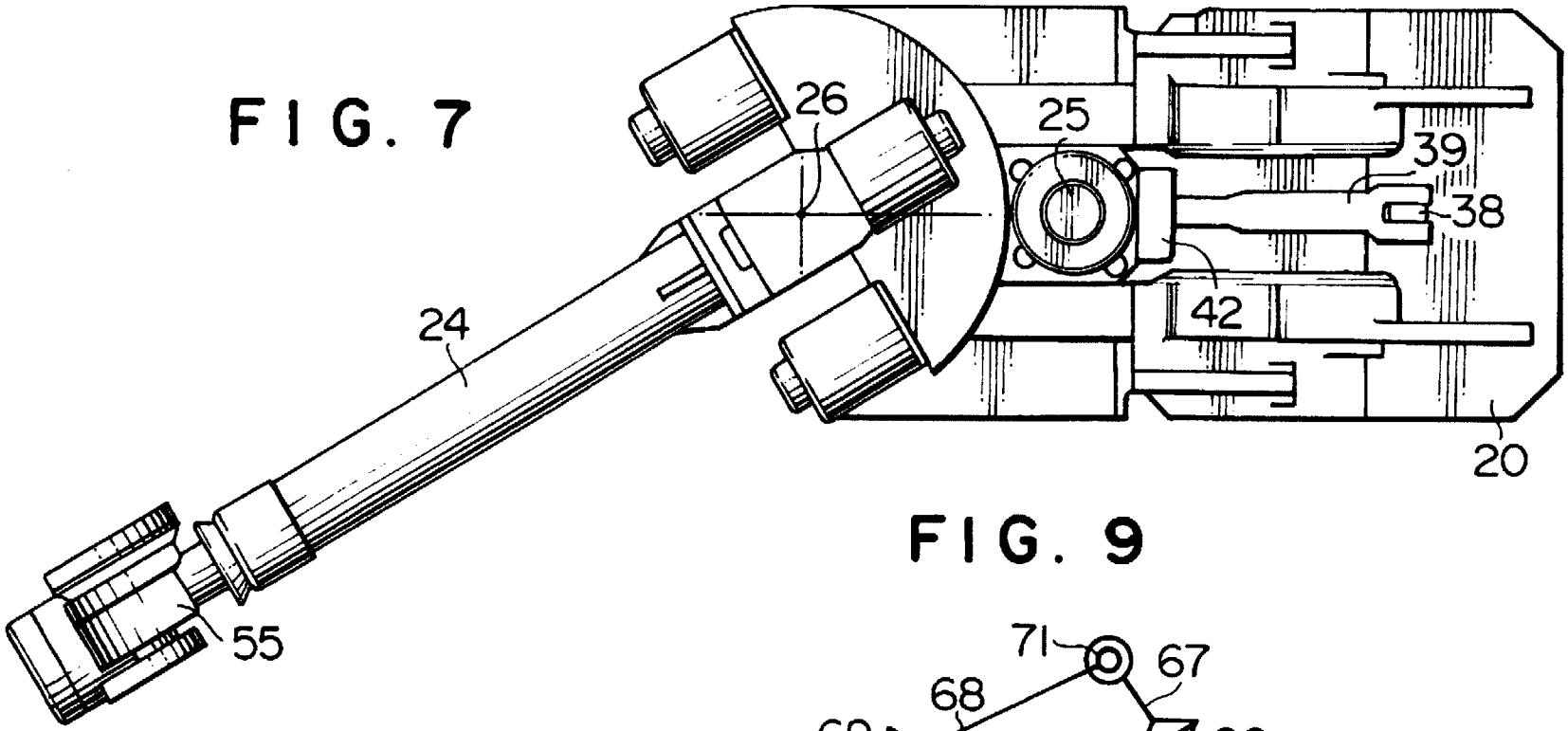
FIG. 7 is a plan view of the robot with the upper arm in a forwardly shifted position.

Referring now to FIGS. 5 and 6, it will be noted that a driving motor 25 is provided on a rear end portion of the swingable member 42. The motor 25 has an output shaft 46 which is provided with a pulley 46a. On the swingable member 42, there is further provided a pulley 48 which is drivingly connected with the pulley 46a through a belt 47. An intermediate pulley 49 is provided coaxially with the pulley 48 and connected with this pulley 48 to rotate together. A driven pulley 51 is provided at the lower end portion of the stub shaft 54a on the rear end portion 54 of the upper arm 24 and connected with the pulley 49 through a belt 50. It will therefore be understood that by a selective operation of the motor 25 the upper arm can be swingably moved about the axis 26 through an angular range θ13 as shown in FIG. 2. FIG. 7 shows the upper arm 24 in a position swung leftward about the axis 26.

In the structure described above, the hand 55 on the tip end of the upper arm 24 can be moved throughout the range 56 as shown in FIGS. 1 and 2 by selective operation of the driving motors 25, 27 and 81. By an operation of the motor 81, the lower arm is moved to swing between a forwardly inclined position 57 and a rearwardly inclined position 58. In the rearwardly inclined position 58 of the lower arm 22, the swing axis 26 is shifted rearwards to a position shown by reference 26a in FIG. 2. The rear end portion of the swingable member 42 is also shifted rearwards to a position shown by a reference 42b. When the motor 25 is operated with the lower arm 22 located in this rearwardly inclined position 58, the rear end portion 54 of the upper arm 24 will be moved along a circular path having a center of the circle at the point 26a as shown by a reference 54b in FIG. 2.

In a conventional design, the horizontal swinging movement is produced about a vertical axis which will not be shifted rearward even when the lower arm is inclined rearwards. Therefore, the upper arm 24 will be swingably moved about the axis 26 even when the lower arm is fully inclined rearwards. Thus, the rear end portion 54 of the upper arm 24 will be moved along a circular path 54c having a center of circle at the point 26 as shown in FIG. 2. The arrangement of the present invention is advantageous over the conventional design in that the path of the rear end portion 54 of the upper arm 24 is much smaller than in the conventional design.

The illustrated structure is further advantageous in that the motor 25 for driving the upper arm 24 is provided on the swingable member 42 which is formed separately from the upper arm 24. In FIG. 2, it will be noted that the swingable member 42 will be shifted rearwards to the position shown by 42b when the lower arm 2 is fully inclined rearwards. However, since the swingable member 42 is made separately from the upper arm 24, the rear end portion of the member 42 does not move when the upper arm 24 is swung about the axis 26a. According to the conventional design, the upper arm is mounted on the upper end portion of the lower arm and has a rearward extension to provide the aforementioned parallelogram. The rear end portion of the upper arm will therefore be moved along a circular path 59 having a center of circle at the point 26 shown in FIG. 2. The structure of the illustrated arrangement is therefore significantly advantageous over the conventional design in decreasing the space required for locating the robot.

Figure 8:
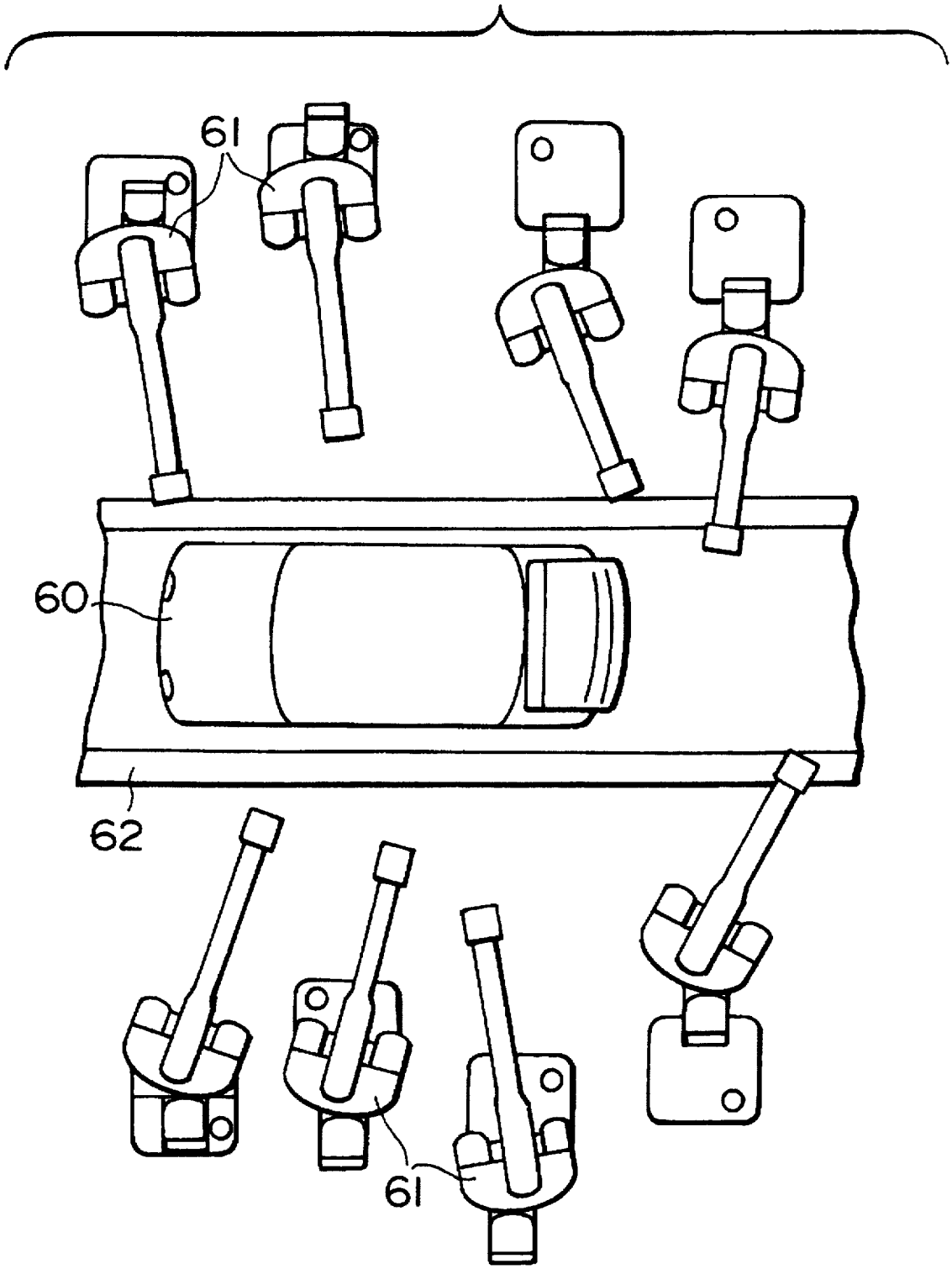
FIG. 8 is a plan view of a vehicle body welding line showing an example of arrangement of the spot welding robot shown in FIGS. 1 through 7.
Figure 10:
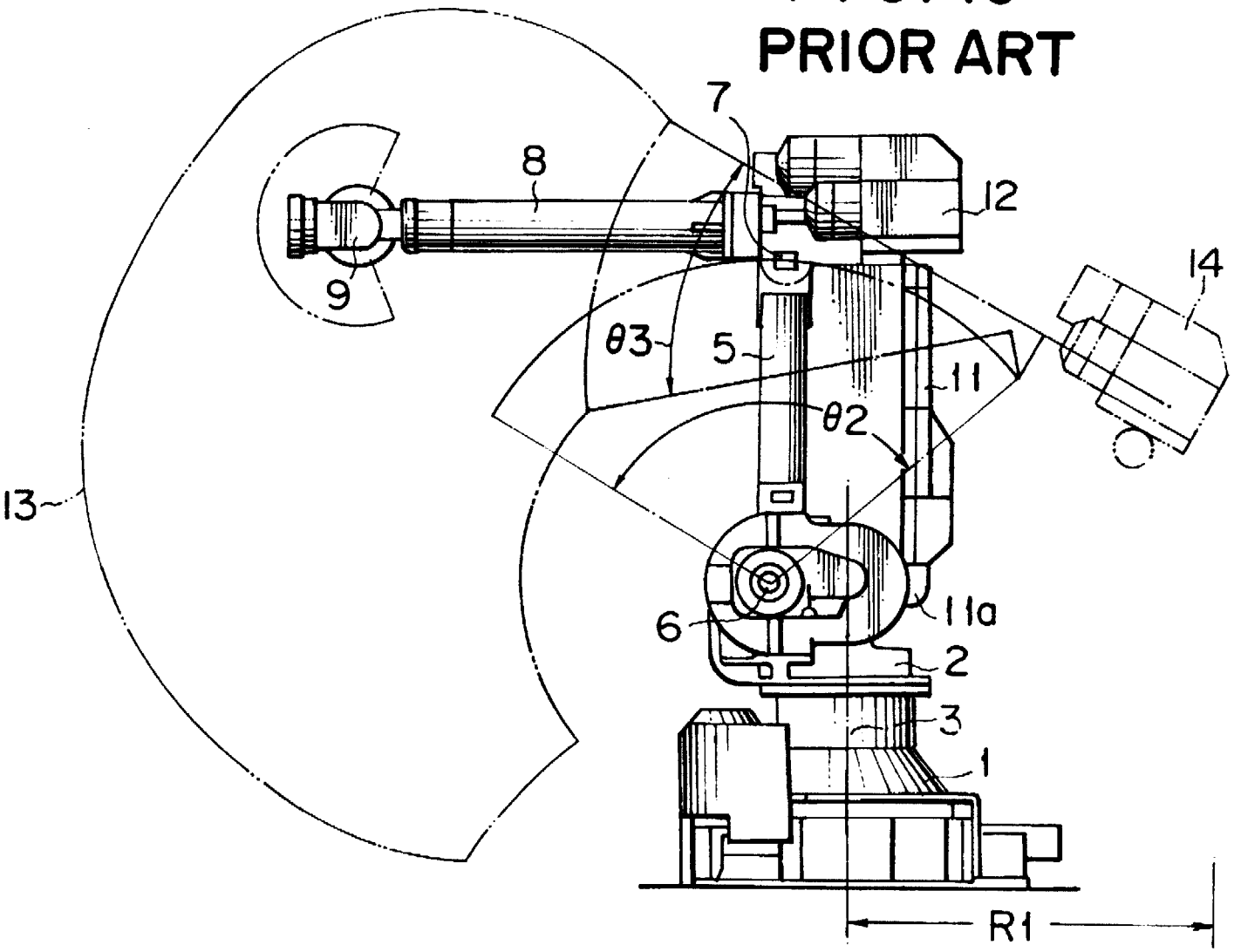
FIG. 10 PRIOR ART
FIG. 10 is a side view similar to FIG. 1 but showing a conventional spot welding robot.
Figure 11:
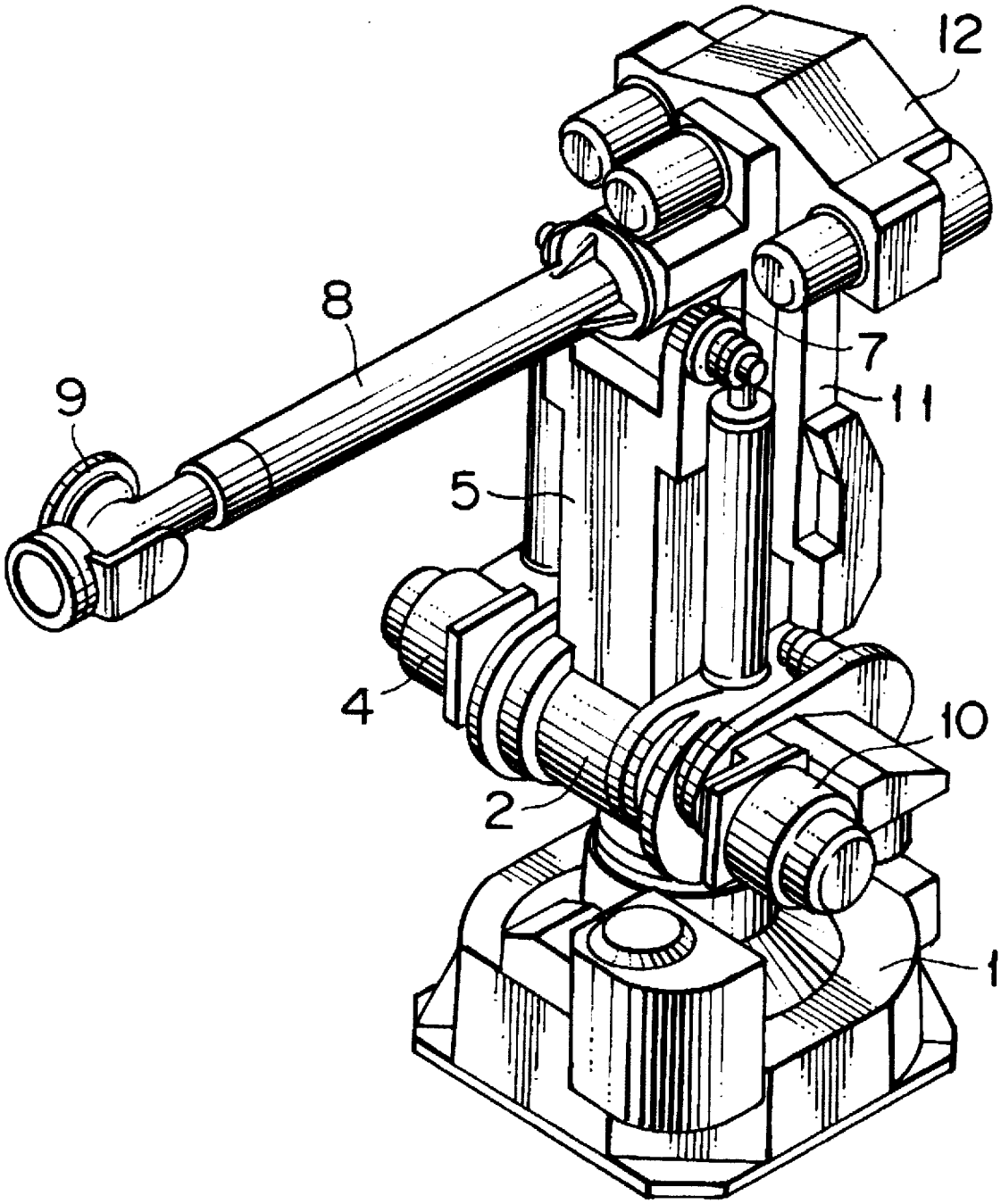
FIG. 11 PRIOR ART
FIG. 11 is a perspective view of the conventional robot shown in FIG. 10.
Figure 12:
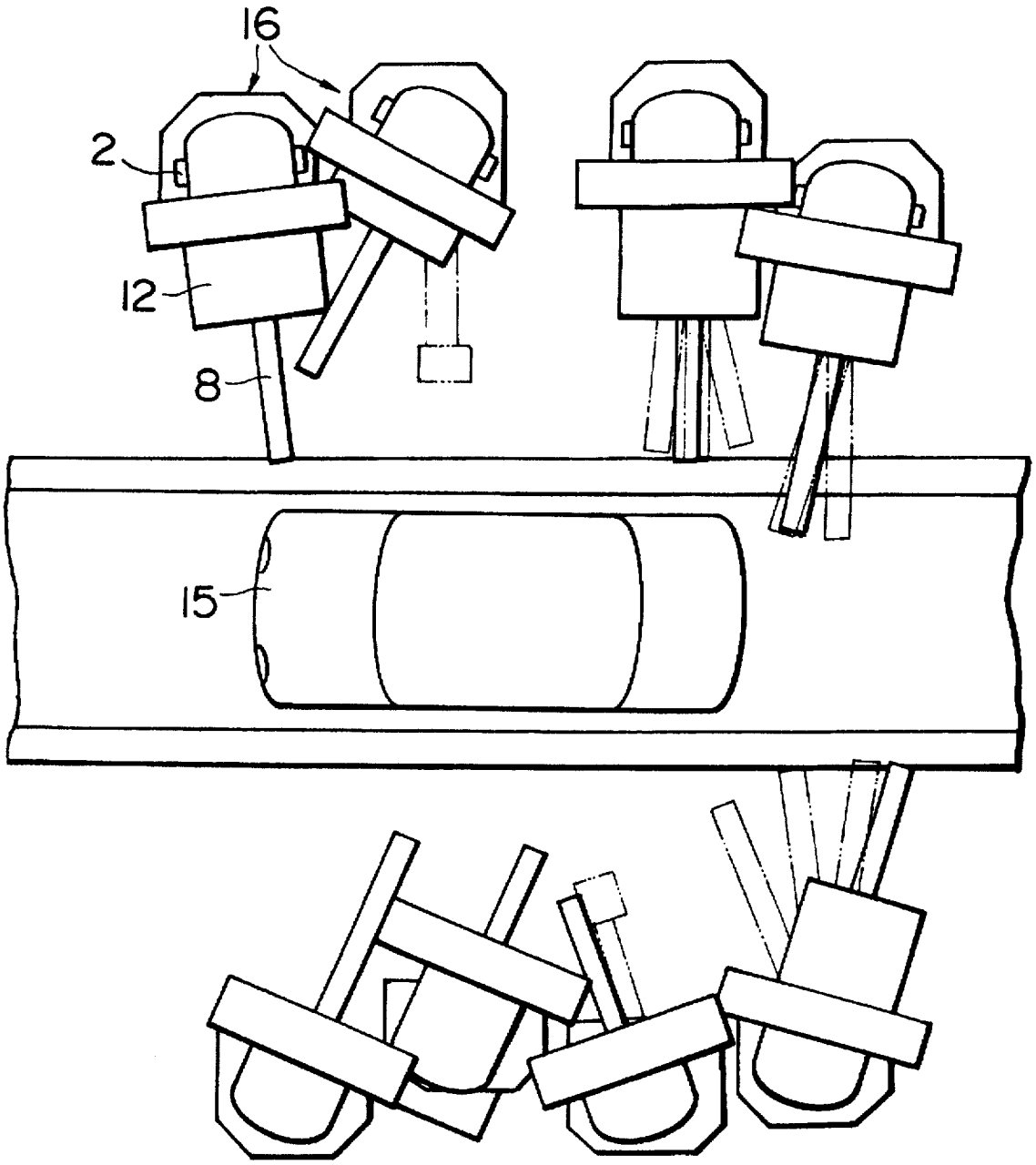
FIG. 12 PRIOR ART
FIG. 12 is a plan view of a vehicle body welding line showing interference between two adjacent robots.

In FIG. 8, there is shown a typical example of arranging the robots in accordance with the present invention. As shown, vehicle bodies 60 to be welded are transported along a conveyor 62. A plurality of robots 61 are arranged along the opposite sides of the conveyor 62. According to the present invention, it becomes possible to locate the robots with close spacings.

Figure 9:
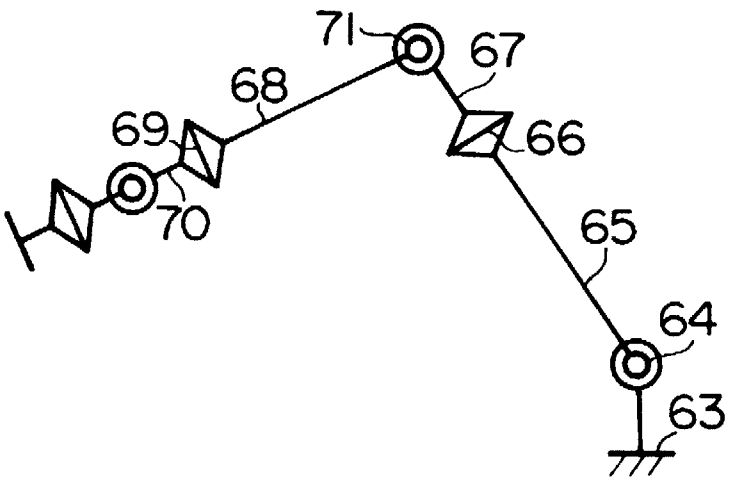
FIG. 9 is a schematical illustration of a spot welding robot in accordance with another embodiment of the present invention.

Referring now to FIG. 9, there is shown another embodiment of the present invention. The robot shown in FIG. 9 includes a stationary base 63 supporting a lower arm 65 through a horizontal shaft 64 for a swingable movement. An intermediate arm 67 is connected with the lower arm 65 through a swivel joint 66 so that the arm 67 is rotatable about a longitudinal axis of the lower arm 65. An upper arm 68 is connected to an upper end of the intermediate arm 67 for a swingable movement about an axis 71 which is perpendicular to the longitudinal axis of the lower arm 65. The upper arm 68 is connected at a tip end with a second upper arm 70 through a swivel joint 69 for rotation about a longitudinal axis of the first upper axis 68.

The invention has thus been shown and described with reference to specific structures, however, it should be noted that the invention is in no way limited to the details of the illustrated structures but changes and modification may be made without departing from the scope of the appended claims.

We claim:

1. An industrial robot including a base, a lower arm mounted at a lower end on said base for a swingable movement about a substantially horizontal first axis, first motor means provided on said base for driving said lower arm to produce the swingable movement of said lower arm about said first axis, a swingable member mounted on said lower arm at an upper end portion of said lower arm for a swingable movement about a second axis which is parallel with said first axis, second motor means provided on said base for driving said swingable member to produce the swingable movement of said swingable member about said second axis, an upper arm mounted at one end portion on said swingable member for a swingable movement about a third axis which is perpendicular to said second axis, said upper arm projecting in one direction from said upper end portion of said lower arm and provided at the other end portion with a robot hand, said swingable member having a portion extending in a direction opposite to said one direction beyond said one end portion of said upper arm, third motor means, mounted on said portion of said swingable member *and intersected by a plane defined by the swingable movement of said upper arm about said third axis,* for driving said upper arm to produce the swingable movement of said upper arm about said third axis.

2. The industrial robot of claim 1 in which said lower arm has a longitudinal axis and said horizontal first axis and said second axis are perpendicular to said longitudinal axis.

3. The industrial robot of claim 1 including a link extending generally parallel to said lower arm for interconnecting said swingable member and said second motor means.

4. The industrial robot of claim 1 in which said robot hand carries welding electrodes.

5. The industrial robot of claim 1 in which said robot hand is mounted for pivotal movement in relation to said upper arm.

6. The industrial robot of claim 1 in which said portion of the swingable member on which said third motor means is mounted is separate from said [swingable member] *upper arm* and does not move when the upper arm is moved about said third axis.

*7. An industrial robot including a base, a lower arm mounted at a lower end on said base for a swingable movement about a substantially horizontal first axis, first motor means provided on said base for driving said lower arm to produce the swingable movement of said lower arm about said first axis, a swingable member mounted on said lower arm at an upper end portion of said lower arm for a swingable movement about a second axis which is parallel with said first axis, second motor means provided on said base for driving said swingable member to produce the swingable movement of said swingable member about said second axis, an upper arm mounted at one end portion on said swingable member for a swingable movement about a third axis which is perpendicular to said second axis, said upper arm projecting in one direction from said upper end portion of said lower arm and provided at the other end portion with a robot hand, said lower arm, said swingable member and said upper arm comprising an arm assembly, said arm assembly having a portion extending in a direction opposite to said one direction beyond said one end portion of said upper arm, third motor means, mounted on said portion of said arm assembly and intersected by a plane defined by the swingable movement of said upper arm about said third axis, for driving said upper arm to produce the swingable movement of said upper arm about said third axis.*

*8. An industrial robot including:*

*a base;*

*an arm assembly including a lower arm mounted at a lower end portion on said base for a swingable movement about a substantially horizontal first axis; a swingable member mounted on said lower arm at an upper end portion of said lower arm for a swingable movement about a second axis which is parallel with said first axis; and an upper arm mounted at a first end portion on said swingable member for a swingable movement about a third axis which is perpendicular to*

*said second axis and provided at a second end portion with a robot hand, said upper arm projecting in one direction from said upper end portion of said lower arm;*

*first motor means for driving said lower arm to produce the swingable movement of said lower arm about said first axis;*

*second motor means for driving said swingable member to produce the swingable movement of said swingable member about said second axis; and*

*third motor means, mounted on a portion of said arm assembly and intersected by a plane defined by the swingable movement of said upper arm about said third axis, for driving said upper arm to produce the swingable movement of said upper arm about said third axis, at least a portion of said third motor means mounted on the arm assembly extending beyond said second axis in a direction opposite to said one direction.*

*9. The industrial robot of claim 8, in which said second and third axes intersect.*

*10. The industrial robot of claim 8, in which said third motor means for driving said upper arm about said third axis is mounted on a portion of said arm assembly situated above said lower arm.*

*11. The industrial robot of claim 10, in which a longitudinal axis of said upper arm passes through said third motor means for driving said upper arm about said third axis.*

*12. The industrial robot of claim 10, in which a longitudinal axis of said upper arm lies in a plane which passes through said third motor means for driving said upper arm about said third axis.*

*13. The industrial robot of claim 8, in which said portion of the arm assembly, on which is mounted said third motor means for driving said upper arm, is fixed relative to said third axis, whereby the third motor means for driving said upper arm does not move with said upper arm about said third axis.*

*14. An industrial robot including:*

*a base;*

*an arm assembly including a lower arm mounted at a lower end portion on said base for a swingable movement about a substantially horizontal first axis; a swingable member mounted on said lower arm at an upper end portion of said lower arm for a swingable movement about a second axis which is parallel with said first axis; and an upper arm mounted at a first end portion on said swingable member for a swingable movement about a third axis which is perpendicular to said second axis and provided at a second end portion with a robot hand, said upper arm projecting in one direction from said upper end portion of said lower arm;*

*first motor means for driving said lower arm to produce the swingable movement of said lower arm about said first axis;*

*second motor means for driving said swingable member to produce the swingable movement of said swingable member about said second axis; and*

*third motor means, mounted on a portion of said arm assembly and intersected by a plane defined by the swingable movement of said upper arm about said third axis, for driving said upper arm to produce the swingable movement of said upper arm about said third axis, said third motor means for driving said upper arm being positioned with a center of gravity thereof located beyond the second axis in a direction opposite to said one direction.*

*15. An industrial robot including:*

*a base;*

*an arm assembly including a lower arm mounted at a lower end portion on said base for a swingable movement about a substantially horizontal first axis; a swingable member mounted on said lower arm at an upper end portion of said lower arm for a swingable movement about a second axis which is perpendicular to a longitudinal axis of said lower arm; and an upper arm mounted at a first end portion on said swingable member for a swingable movement about a third axis which is perpendicular to said second axis, said upper arm projecting in one direction from said upper end portion of said lower arm;*

*first motor means for driving said lower arm to produce the swingable movement of said lower arm about said first axis;*

*second motor means for driving said swingable member to produce the swingable movement of said swingable member about said second axis; and*

*third motor means, mounted on a portion of said swingable member extending from said upper end portion of said lower arm in a direction opposite to said one direction, and intersected by a plane defined by the swingable movement of said upper arm about said third axis, for driving said upper arm to produce the swingable movement of said upper arm about said third axis.*

*16. An industrial robot including:*

*a base;*

*an arm assembly including a lower arm mounted at a lower end portion on said base for a swingable movement about a substantially horizontal first axis, and an upper arm assembly situated above the lower arm for a swingable movement about a second axis which is spaced from and parallel with said first axis, the upper arm assembly comprising a first portion extending in one direction beyond the lower arm and a second portion extending in a direction opposite to said one direction beyond the lower arm, said first portion being mounted for a swingable movement about a third axis which is perpendicular to said second axis;*

*first motor means for driving said lower arm to produce the swingable movement of said lower arm about said first axis;*

*second motor means for driving said upper arm assembly to produce the swingable movement of said upper arm assembly about said second axis; and*

*third motor means, mounted on said second portion of said upper arm assembly and intersected by a plane defined by the swingable movement of said first portion of the upper arm assembly about said third axis, for driving said first portion of the upper arm assembly to produce the swingable movement of said first portion of the upper arm assembly about said third axis.*

*17. The industrial robot of claim 16, in which said second portion of the upper arm assembly, on which is mounted said third motor means for driving said first portion of the upper arm assembly, is fixed relative to said third axis, whereby the third motor means for driving said first portion of the upper arm assembly does not move with said first portion about said third axis.*

*18. An industrial robot including:*

*a base;*

*a lower arm mounted at a lower end portion on said base, and first motor means for swinging the lower arm about a first substantially horizontal axis;*

*an arm assembly above said lower arm including a swingable member mounted on an upper end portion of said lower arm for a swingable movement about a second axis which is parallel with said first axis, and an upper arm mounted at one end portion on said swingable member, said upper arm having a longitudinal axis disposed above the upper end portion of said lower arm, and having a robot hand at an opposite end portion thereof;*

*second motor means for swinging said swingable member about said second axis; and*

*third motor means mounted on said arm assembly at said one end portion of said upper arm for swinging said upper arm about a third axis which is perpendicular to said second axis, said third motor means being intersected by a plane defined by the swinging of said upper arm about said third axis.*

*19. The industrial robot of claim 18, wherein the second and third axes intersect.*

* * * * *